L. D. CRAIG.

APPARATUS FOR CUTTING ROAD BEDS.

APPLICATION FILED OCT. 21, 1909.

Reissued Dec. 14, 1909.

13,055.

Attest.
Bert. M. Stahl.
Edward N. Sexton

Inventor.
Lee D. Craig.
by Spear, Middleton, Donnelan & Spear
Att'ys.

UNITED STATES PATENT OFFICE.

LEE D. CRAIG, OF SAN FRANCISCO, CALIFORNIA.

APPARATUS FOR CUTTING ROAD-BEDS.

13,055. Specification of Reissued Letters Patent. Reissued Dec. 14, 1909.

Original No. 916,676, dated March 30, 1909, Serial No. 438,873. Application for reissue filed October 21, 1909. Serial No. 523,928.

*To all whom it may concern:*

Be it known that I, LEE D. CRAIG, a citizen of the United States, residing in the city and county of San Francisco and State of California, have invented certain new and useful Improvements in Apparatus for Cutting Road-Beds, of which the following is a specification.

The hereinafter described invention relates to an improved portable apparatus for the cutting of the surface of asphaltum, bituminous, or macadamized streets or roadbeds, for the digging of ditches, trenches, or narrow runways within which to lay sewer, gas, and water pipes generally, or for the laying of conduits for telephone and telegraph wires; the object being to cut through the artificial layer or layers of the road bed along the line of the trench to be formed, without disturbing the surface of the roadbed adjacent the line of cut.

At present the asphaltum or bituminous surface of the roadbed, also the concrete foundation therefor, is cut through by hand, which is not only slow and tedious work, as a gang of men make but slow progress per day, but it is likewise exceedingly expensive work.

By the use of the invention forming the subject of the present application, the expense incident to the digging of trenches in roadbeds for the laying of pipes generally is not only reduced to a minimum, but the progress of the work is materially advanced over the cutting of the surface of the layers of asphalt or bitumen, and the concrete constituting the foundation for the outer covering surface by hand labor.

To comprehend the invention reference should be had to the accompanying drawings, wherein—

Figure 1:
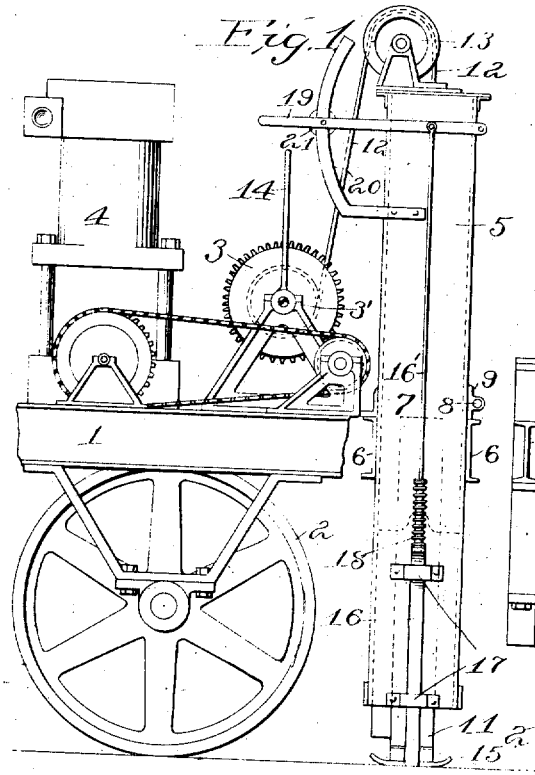
Figure 2:
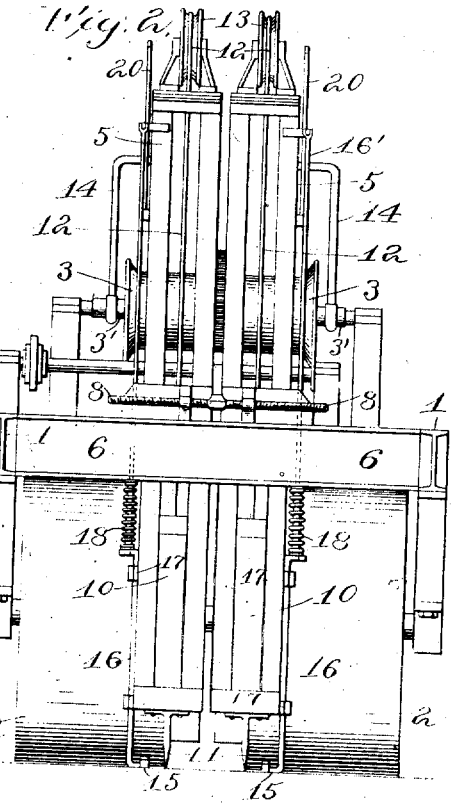
Figure 3:
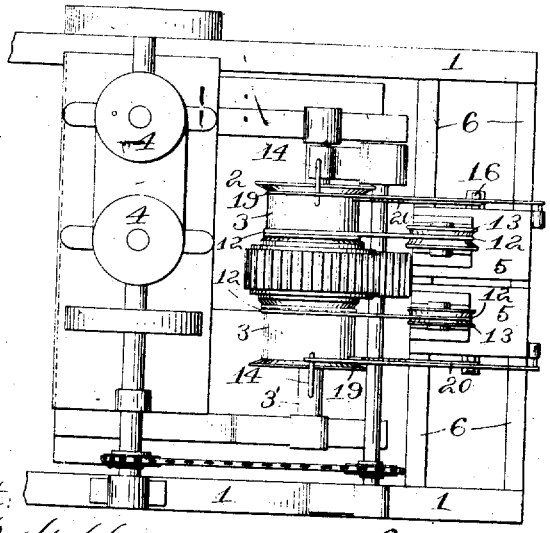

Figure 1 is a side view of the improved apparatus. Fig. 2 is a rear end view of the same; Fig. 3 is a top plan view of the machine, partly broken away.

In the drawings, the numeral 1 is used to indicate any suitable form of a supporting frame or truck, which is mounted on the wheels 2. On the supporting truck 1 is contained the hoisting drums 3, which are loose on the drive shaft 3′, and, in the present case, are driven by the drive shaft from the gasolene engine 4. This engine through the medium of the usual power transmitting mechanism, is utilized as the motor power to actuate the wheels 2 for imparting travel to the supporting truck 1. At the rear end of the supporting truck or platform 1, the vertically disposed parallel frames 5 are located, which frames are laterally movable on the supporting cross beams 6, between which beams the frames 5 work, being supported thereon by means of the flanged bearing plates 7, projecting from the said frames 5. The frames 5 are laterally adjustable toward and from each other by means of the right and left hand screw threaded adjusting bolt 8, which works through the bearing blocks 9 projecting from the said frames 5, Fig. 2, of the drawings. The purpose of permitting lateral adjustment of the frames 5, is to vary the position thereof relative to each other in accordance with the width of the trench or ditch to be excavated.

Within each of the vertically disposed parallel frames 5 is movably located a hammer 10, of a weight of approximately five hundred (500) pounds, which hammer, at its lower end, carries one or more cutting tools 11. Said cutting tools, on the drop of the hammers 10, penetrate under considerable force the surface of the roadbed, to free the same for easy removal by those employed for removing the dirt. The hammers 10 are raised by means of the cables 12, which pass over the sheaves 13 situated at the upper end of the frames 5, and wind onto the hoisting drums 3, thrown into engagement with the drive shaft 3′ by means of the clutch levers 14, which levers are under the control of the operator of the machine. When the operator releases the clutch levers 14, the hoisting drums 3 are freed, and the hammers 10 fall by gravity, the weight of the said falling hammers forcing the cutting tool or tools carried thereby into the surface of the roadbed.

On the withdrawal of the cutting tool or tools by the upward movement of the hammers, there is a tendency of the asphaltum or bituminous covering of the roadbed adjacent the line of the cut being made to pull upwardly or away from its foundation, and to prevent such disturbance of the surface of the roadbed adjacent the line of cut under the pulling strain of the hammers, the pressure plates or shoes 15 are utilized, which plates or shoes are arranged at each side of the cutting tool 11 so that when depressed they will bear onto the surface of the roadbed at each side of the line of work. The said pressure plates or shoes are carried by the slide bars 15′, which are connected by the stem 16 to the lift rod 16′, the said stem 16 working through the guides 17 secured to the frames 5. The stem 16, for each of the pressure plates or shoes, is held down by the pressure of the heavy spring 18, and the same are raised clear of the surface of the roadbed, as the machine is advanced along the line of work, by means of the lift rod 16′, which rod is operated by means of the fulcrumed lever 19, to which the upper end of the lift rod 16′ is connected, the said lever 19 being under the control of the operator. This lever works over the quadrant 20, and is held in adjusted position by means of the pawl 21 carried by the lever engaging with the said quadrant.

After the machine has been positioned for the work to be performed, and the frames 5, within which work the hammers carrying the cutting tools, have been properly alined and adjusted relative each other, the pressure plates or shoes are then lowered to bear onto the surface of the roadbed adjacent the line of work, and the machine maintained in such position until the artificial layers of the roadbed, *i. e.* the asphaltum covering and the concrete foundation, have been penetrated by the cutting tool or tools, after which the machine is advanced a given distance, during such forward movement of the apparatus the pressure plates or shoes being raised clear of the surface of the roadbed.

By the use of the herein described machine, the hard resisting layers of the roadbed are quickly penetrated by the cutting tool or tools carried by the hammers, and the work of placing the said portion of the roadbed in condition for removal along the line of the trench easily accomplished, and this at but slight expense in comparison with the hand means at present employed, and the cutting of the mentioned layers of the roadbed secured without any resultant injury to the surface of the roadbed adjacent the line of cut.

As a result of the structure above described, not only does the shoe prevent the asphaltum or covering along the outer edge of the trench from being lifted by the rising knife, but it serves to hold this part of the asphaltum against cracking or disturbance during the down stroke of the knife; but at the inner face of the knife there will be more or less lateral as well as vertical disturbance of the asphaltum, and particularly when two knives are being used cutting at opposite sides of the trench, the intermediate sheet or block between the two knives either buckling up more or less, or shifting laterally, and thereby loosening itself from the base or binder material, rendering it in good condition for easy removal. The knife, in raising, also acts to lift the asphalt on its inner side, thus detaching it from its base. The knives are independently mounted in that one can be operated without the other or by manipulating first one and then the other of the hand levers 14; the knives may be made to work alternately or one may be made to deliver more cutting blows on one side of the trench than at the other side, as conditions may require, or both knives may be operated in unison. The alternate action of the hammers gives a pronounced shifting of the asphaltum laterally, while the simultaneous action gives a buckling effect, and in practice the asphaltum will crack across from cut to cut, as the work proceeds, but never out beyond the cut, all the disturbance, cracking, shifting or buckling of the asphalt taking place between the points of effective resistance, *i. e.* where the asphalt is firmly held by the shoes, the beveled face of the knife aiding in this effect.

I claim as my invention:

1. In apparatus for the described purpose, the combination with a portable supporting platform, of a vertically disposed guide frame carried thereby, a gravity cutting tool guided by said frame, means for operating the cutting tool, and a device acting against the surface of the roadbed adjacent the cutting tool to prevent the surface of the roadbed being disturbed adjacent the line of cut.

2. In apparatus for the described purpose, the combination with a portable supporting frame, of a plurality of vertically disposed parallel guide frames carried thereby, and adjustable toward and from each other, gravity cutting tools guided by the said frames, means for operating the cutting tools, and devices one for each cutting tool, acting against the surface of the roadbed adjacent the tool to hold the surface against disturbance, adjacent the cutting tools.

3. In an apparatus for the described purpose, the combination with a portable supporting platform, of devices carried thereby for cutting the surface of a roadbed along the line of trench work, mechanism for actuating said cutting devices under pressure to cause the same to penetrate the surface of the roadbed, and means for acting against the surface of the roadbed adjacent the line of work during the action of the cutting devices, said means preventing the surrounding or adjacent surface of the roadbed being disturbed as the cutting devices are withdrawn.

4. In an apparatus for the described purpose, the combination with a portable supporting carrier, of cutters carried thereby one at each side of the line of trench work, mechanism for operating the said cutters to cause the same to penetrate the roadbed, and devices one for each cutter, on the outer side thereof acting on the surface of the roadbed adjacent the cut to prevent the adjacent surface of the roadbed being disturbed, substantially as described.

5. In an apparatus for the described purpose, the combination with a portable carriage, of a plurality of vertically disposed parallel guide frames thereon, cutters guided by said frames and means for operating the cutters, said parallel guide frames being adjustable toward and from each other in accordance with the width of the trench to be cut in the roadbed, substantially as described.

6. In apparatus for the described purpose, the combination with a portable supporting frame, of a plurality of vertically disposed parallel guide frames carried thereby, and adjustable toward and from each other, gravity cutting tools guided by the said frames, means for operating the cutting tools, and shoes, one for each cutting tool, acting against the surface of the roadbed adjacent the cutting tools, each of said shoes being adjustable with the cutter and guide frame to which it belongs, substantially as described.

7. In combination in a machine of the class described, a portable carrier, an upright guide, a weighted cutter movable thereon, means for operating the cutter, and a shoe mounted on the guide, said guide, with the cutter and shoe, being adjustable, substantially as described.

8. In combination in a machine of the class described, a portable carrier, an upright guide mounted thereon, a cutter movable on the guide, with operating means therefor, and a spring pressed shoe to bear on the surface of the roadbed adjacent the cutter, substantially as described.

9. In apparatus for cutting asphalt, concrete and the like of roadbeds, a frame having carrying wheels, a vertical guide, a weighted drop cutter movable thereon having its cutting edge extending parallel with the line of the trench and directed downwardly to penetrate the material, and operating means for the cutter, substantially as described.

10. In a machine of the class described, a portable carrier, a pair of weighted drop cutters arranged opposite each other, one for each side of the trench to be cut, guide means to control the vertical movement of the cutters and operating means for the cutters, substantially as described.

11. In apparatus of the character described, a frame having carrying wheels, guides, a pair of weighted cutters movable vertically thereon and at opposite sides of the space to be cut, said cutters being independently operable to work in unison or in alternation, substantially as described.

12. In combination in apparatus of the class described, the combination of a frame having carrying wheels, vertically extending guide means, a pair of weighted beveled edge cutters movable thereon and at opposite sides of the space to be cut, and pressure shoes, one for each cutter, and adjacent thereto on the outer side for holding the asphaltum on the outer edges of the trench leaving the intermediate portion free to yield to the disturbing influence of the beveled cutters, substantially as described.

13. In combination in apparatus for cutting roads of asphalt, concrete or the like, a portable carriage, a pair of upright guides on the carriage, a drive shaft on the carriage, a pair of weighted cutters movable on the guides, and connections from the drive shaft for elevating the weighted cutters, substantially as described.

14. In combination in apparatus for cutting roads of asphalt, concrete or the like, a portable carriage, guide means thereon, a pair of weighted cutters movable on the guide means, and arranged substantially opposite each other with their cutting edges extending substantially parallel with the line of trench work, and operating connections for raising the weighted cutters, substantially as described.

15. In combination in apparatus for cutting roads of asphalt, concrete or the like, a portable carriage, a pair of upright guides on said carriage, weighted cutters guided thereby, said guides being adjustable toward and from each other to vary the width of the trench, a drive shaft on the carriage and driving connections therefrom to the upper ends of the adjustable guides for elevating the weighted cutters, substantially as described.

16. In combination in apparatus for cutting roads of asphalt, concrete or the like, a portable carriage, upright guides on the carriage, a pair of wheels or drums with a space between them and on opposite sides of the center line of the trench, a weighted cutter for each guide, and means for elevating the cutters, substantially as described.

17. In a machine for cutting the asphalt surface of roadways, a portable carriage, a vertically operating cutter, operating means for the cutter, and a device arranged adjacent the cutter on the outer side thereof to prevent disturbance of the asphalt which is to remain, substantially as described.

In testimony whereof I have affixed my signature in the presence of two witnesses.

LEE D. CRAIG.

Witnesses:

HENRY E. COOPER,
WALTER DONALDSON.